United States Patent [19]

Matt

[11] 4,074,512

[45] Feb. 21, 1978

[54] LOW-FRICTION FABRIC BEARING

[75] Inventor: Richard J. Matt, Simsbury, Conn.

[73] Assignee: Textron, Inc., Providence, R.I.

[21] Appl. No.: 376,235

[22] Filed: July 3, 1973

Related U.S. Application Data

[62] Division of Ser. No. 160,661, July 8, 1971, Pat. No. 3,765,978.

[51] Int. Cl.² .................... D02G 3/04; D02G 3/36; D04C 1/06
[52] U.S. Cl. .................... 57/140 BY; 57/153; 87/1; 156/148; 308/238; 428/252; 428/265
[58] Field of Search ............ 308/238, DIG. 7; 87/1, 87/8; 57/140 BY, 140 C, 153, 164; 28/75 R; 428/264, 252, 253, 264–267; 156/85, 148, 155, 245

[56] References Cited

U.S. PATENT DOCUMENTS

| 2,953,418 | 9/1960 | Runton et al. | 308/238 |
| 3,000,076 | 9/1961 | Runton et al. | 308/238 |
| 3,030,248 | 4/1962 | Runton | 57/140 BY |
| 3,037,893 | 6/1962 | White | 57/140 BY |
| 3,328,100 | 6/1967 | Spokes et al. | 308/238 |
| 3,692,375 | 9/1972 | Matt et al. | 308/238 |

Primary Examiner—John Petrakes
Attorney, Agent, or Firm—Hopgood, Calimafde, Kalil, Blaustein & Lieberman

[57] ABSTRACT

Improved wear and load-carrying properties result for a resin-impregnated fabric bearing wherein the bearing surface includes, as the most significant fabric component, a yarn which is a compounded bundle of sized TFE filaments and sized filaments of high-temperature nylon, in the proportion of at least no more than 50 percent TFE by volume. The yarn is loosely twisted, to the extent that after construction of a fabric with said yarn, the yarn is fully washable, to remove the sizing, down to the innermost filaments. This enables full impregnation of the fabric with synthetic resin, and curing in substantially intimate and continuous and void-free relation of the resin to all filaments within the yarn of the fabric.

14 Claims, 5 Drawing Figures

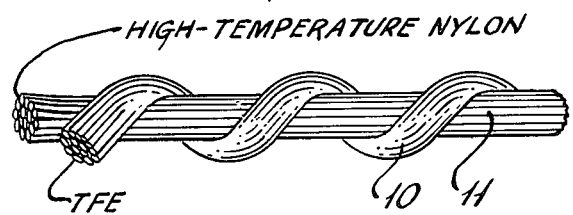
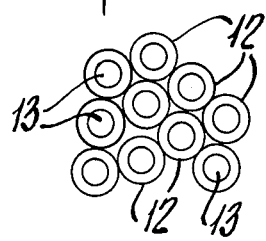
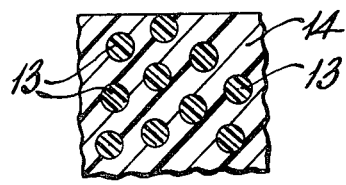
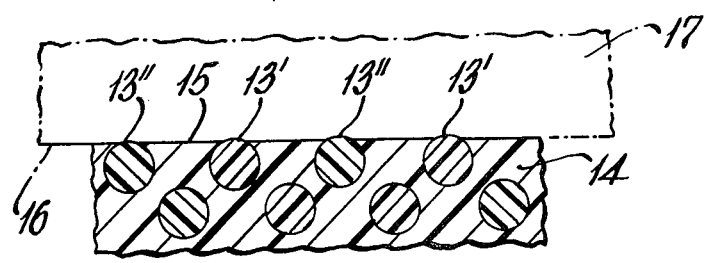
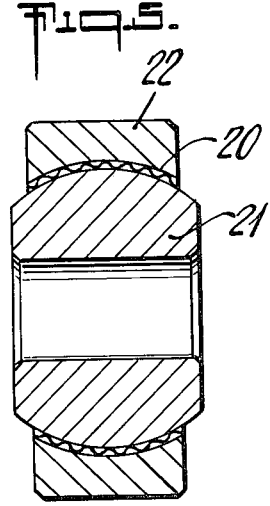

LOW-FRICTION FABRIC BEARING

This is a division of application Ser. No. 160,661 filed July 8, 1971, now U.S. Pat. No. 3,765,978.

This invention relates to low-friction fabric bearings, to the method of making the same, and to the yarn from which the fabric is made.

Low-friction fabric bearings in use today employ tetrafluoroethylene (TFE) filaments as the low-friction component but are subject to certain limitations which curtail the range of use. For example, maximum or excessive loads are accompanied by undue wear and rapid breakdown. And maximum operating temperature is unduly limited, due to further mechanical degradation under load or at elevated temperature. It is believed that many of these undesirable limitations arise from the assumption that a preponderance of TFE is required at the bearing surface.

It is, accordingly, an object of the invention to provide an improved bearing construction of the character indicated, and an improved method of making the same.

Another object is to provide an improved yarn for use as the low-friction component of a bearing of the character indicated.

A further object is to provide a method and means whereby increased body density is provided in support material for low-friction fibers at the bearing surface.

A still further object is to meet the above objects with greater load-bearing capacity, longer-wear performance and capability of operation at higher temperatures than heretofore.

A specific object is to provide increased support for low-friction fibers at the bearing surface, whereby TFE filaments are better retained against rolling to the point of breakage.

It is a general object to achieve the foregoing objects with a structure which is inherently relatively economical to manufacture, which is at least equal to the performance of present high-quality bearings within their limited range of use, and which extends beyond present bearings the range of performance in regard to useful life, maximum load and maximum elevated operating temperature.

Other objects and various further features of novelty and invention will be pointed out or will occur to those skilled in the art from a reading of the following specification in conjunction with the accompanying drawing. In said drawing, which shows, for illustrative purposes only, preferred features of the invention:

FIG. 1 is an enlarged simplified fragmentary view in perspective to illustrate a yarn of the invention;

FIGS. 2 and 3 are similar simplified and enlarged fragmentary sectional views through part of a bundle of filaments in yarn of the invention, at different stages of a method of the invention;

FIG. 4 is an even more greatly enlarged sectional view through part of a bearing of the invention; and FIG. 5 is a simplified longitudinal sectional view of a complete bearing embodying the invention.

The invention contemplates major reliance upon filaments of high-temperature nylon to function with TFE filaments in the yarn which is compounded for use as the low-friction bearing surface in a fabric bearing, the bearing being completed and consolidated by a cured synthetic resin. The nylon provides high strength and stability at elevated temperatures and is present in the yarn to the extent of at least 50 percent by volume of all filamentary components (including the TFE); preferably, the TFE filaments are present to the extent of 20 to 30 percent by volume. It is of importance to the invention that the filaments of the yarn be relatively loose and that they be subjected to as little twist as possible, consistent with an ability to handle the yarn, as in the process of constructing a bearing fabric in which said yarn appears as the major component of the bearing-surface material, on at least one side of the fabric.

Conventionally, the filaments to be compounded into the yarn are supplied with a very thin sizing agent or coating which simplifies handling in the construction of a fabric. It is difficult to show the dimensional significance of this coat, and in the past its presence has been neglected. I have discovered, however, that the sizing coat on commerically available filaments, e.g., of TFE, or of high-temperature nylon, is an important factor to be reckoned with, in that curing temperatures for the synthetic impregnating resin are such as to generate fine bubbles or otherwise to react with the sizing agent. The product of such reaction, e.g., gas bubbles generated upon heating sizing agents containing vinyl alcohols, becomes a permanent part of the cured resin in the immediate vicinity of the filament to be supported. Not only is the density of resin thereby reduced at and near the bearing surface, but filament support and entrapment by the resin are materially degraded.

Now, by providing such yarn as a loose combination, i.e., with little or no twist, e.g., one to three twists per inch, I assure that the innermost filaments of the yarn are loose and accessible, even after performing the braiding, knitting or weaving operations by which the bearing fabric is constructed. Due to the loose nature of the yarn, even after fabric construction, I find that it is possible to thoroughly wash off the sizing agents, using a suitable solvent for the sizing agent. Washing produces a limp fabric, with even more voids within the yarn strands, and cleansed down to the very walls of the individual filaments. I have found a vastly greater affinity of the yarn filaments for liquid synthetic resin, after such washing, drying and also pressing the fabric. I can only surmise that the cleansed filaments establish plural capillary paths which, due to the small degree of twist, readily "wick" or induce the flow of liquid resin to the very core of the yarn, in intimate, continuous and void-free relation with all filaments thereof; at least, this is my observation, using high-power microscopic analysis. Such analysis confirms unusual resin-rich support for all filaments, providing unusually high density at and near the bearing surface.

The first four figures illustrate the foregoing on a simplified basis, for the case of yarn made of a bundle 10 of continuous sized TFE filaments, loosely twisted with a bundle 11 of continuous sized filaments of high-temperature nylon (FIG. 1). This is the yarn which becomes the significant bearing-surface component, whether the fabric is braided, knitted or woven.

FIG. 2 illustrates, with great and obvious exageration, the sizing coat 12 for each filament 13 in a yarn bundle. The coated filaments are not drawn tight, thanks to the bare minimum of twist, thus rendering the bundle readily susceptable to washing in a solvent for the sizing agent. Washing thoroughly removes the sizing agent, allowing full synthetic-resin penetration, as suggested at 14 in FIG. 3. In FIG. 4, such a relationship appears in greater detail, illustrating that TFE filaments (13') and high-temperature nylon filaments (13") both appear at the bearing surface 15, the contour of which depends upon that of a contour-forming surface 16;

surface 16 is seen as part of a molding element 17 to which the fabric is conformed in producing the desired bearing surface 15.

Several illustrative examples of the use of my invention will be given.

EXAMPLE ONE

A satin-weave fabric, with 4:1 face, is produced using a multi-component warp yarn of the invention, and a filling yarn of continuous-filament, type 430 Nomex, the latter being a designation by the E. I. duPont Company for a particular one of its high-temperature nylons. The filling yarn is strictly described, for each end, as 200/100/3S, of the type 430 Nomex; i.e., 200-denier Nomex yarn, consisting of 100 filaments, said yarn being twisted three times per inch. The warp yarn is strictly described as one end of 400/60/0 Teflon* and two ends of 200/100/0 type 430 Nomex; in other words, the TFE end comprises 400-denier TFE yarn with sixty filaments, and with zero twist, while the two Nomex ends are each as described for the filler, but with zero twist. The components of the warp yarn are then twisted three turns per inch. The sectional areas of the TFE filaments and Nomex filaments in the warp yarn are chosen to present about 25 percent TFE at the bearing surface, the rest of the bearing-surface filaments being Nomex.

* duPont Company trademark for its TFE filament.

After weaving, the fabric is thoroughly washed in boiling water to remove the sizing, should the sizing happen to be water-soluble. Then after appropriate rinsing, drying and pressing, the fabric is cut and applied as the liner 20 of a plane spherical bearing (see FIG. 5).

In making the bearing of FIG. 5, the inner ring 21 is a spherical ball which is first coated with a suitable mold-release agent. The outer ring 22 is deformable and ultimately has a spherical bore as shown, but this is initially a straight cylindrical bore into which is inserted a cutting from the washed fabric, suitably coated with an uncured synthetic-resin adhesive; the adhesive may be a phenolic, epoxy, fluroethylene-propylene (FEP), or polyimide. Ring deformatiion, bonding and curing may proceed generally as described in Litsky U.S. Pat. No. 3,303,557.

The completed bearing exhibits superior performance, exceeding that of "all-Teflon" surfaced bearings in the important respects of maximum load, life (i.e., low wear) under load, and in general a higher upper temperature limit for satisfactory operation, the latter feature being a function of the synthetic resin and of the non-Teflon yarns or yarn components.

EXAMPLE TWO

The bearing fabric is again a satin weave, differing from Example One only in the use of a polyester filling rather than a Nomex filling. The filling yarn for the back comprises one end, 60/2 cotton-count spun continuous-filament polyester, known as Kodel* #IV, high tenacity, Type 421, 1¼ denier. The fabric is washed thoroughly in boiling water to remove all size, and then dried and pressed before assembly into a bearing. Drying proceeds at 325° F for 15minutes in an air-circulating oven, to accomplish a heat soak and fabric shrink, within the curing temperature of the synthetic resin (in this case, phenolic), so as to avoid or materially reduce shrinking during the resin cure.

* Kodel is a tradmark of the Eastman Kodak Company for its polyester fiber.

EXAMPLE THREE

The bearing fabric is again a satin weave, differing from the foregoing only in the use of glass-fiber yarn as the filling. This filling is described as one end ECE 450-1/2 Fiberglas yarn. Washing and finishing are as described for Example One.

EXAMPLE FOUR

The bearing fabric is a tubular braid, of yarns constructed generally as described for the warp yarn of Example One, the same being cut to length and applied to a mandrel of desired contour, coated with a release agent, and the braid is backed by a Fiberglas-epoxy matrix, as described in greater detail in copending Matt, et al. application Ser. No. 94,091, filed Dec. 1, 1970, now U.S. Pat. No. 3,692,375. The size is removed after braiding and before application to the mandrel.

EXAMPLE FIVE

The bearing fabric is a knitted tube, conventionally fabricated of yarns generally as described for the warp yarn of Example One, the same being cut to length, applied to a mandrel, and backed and consolidated as for Example Four. Again, size is removed after knitting and before application to the mandrel.

The described yarns, fabrics and bearings will be seen to achieve all stated objects, with superior results. And, the particular examples are purely illustrative, in that other combinations may be used within the invention. The particular advantages are that the Nomex filaments substantially improve wear-resistance. The removal of sizing from the fabric assures enhanced resin density, for greater bonding to the Nomex and therefore better localized support of TFE filaments exposed at the bearing surface. If still further bonding to all filaments is desired, the TFE filaments should be etched.

In spite of the predominant use of Nomex at the bearing surface, the presence of TFE enables a low coefficient of friction (0.02 to 0.08). Low wear is attributed to ability of the support resin to prevent TFE filaments from rolling and necking down to a point where they might otherwise break or crumble. And the indicated loose twist enables full washing of all filaments, for highly effective resin impregnation. The substantial use of Nomex enables high strength and bondability, without noticeably degrading the friction coefficient, with good physical properties at elevated temperatures up to 450° F.

Stated in other words, I have found that the best of the low-friction properties of TFE filaments are realized by the time the proportion of TFE at the bearing surface has reached 50 percent; in fact, when the added strength of the combining Nomex is taken into account, the best results are achieved for a TFE proportion of 20 to 30 percent by volume, as in the examples presently given.

What is claimed is:

1. A size-free low-friction fabric for void-free impregnation with a curable synthetic resin, said fabric being the washed product of construction from a yarn comprising a compounded bundle of sized TFE filaments and sized filaments of a high-temperature nylon in the proportion of at least no more than 50 percent TFE by volume and loosely twisted to an extent not substantially exceeding three twists per inch; whereby, when said fabric is embodied in a bearing surface potted with a synthetic resin, the resin may be induced to flow into and throughout the cleaned and loose yarn bundle, for substantially intimate and continuous and void-free consolidation therewith.

2. A fabric according to claim 1, in which said filaments are substantially continuous.

3. A fabric according to claim 1, in which said TFE filaments are in the proportion ranging from 20 to 30 percent by volume.

4. A fabric according to claim 1, in which said TFE filaments are etched filaments.

5. A low-friction bearing fabric according to claim 1, wherein the construction is a braid.

6. A low-friction bearing fabric according to claim 1, wherein the construction is a knit.

7. A low-friction bearing fabric according to claim 1, wherein the construction is a weave.

8. A bearing element comprising a body with a bearing surface, said body including a size-free fabric constructed to present at said surface a loosely twisted yarn comprising size-free TFE filaments and high-temperature nylon filaments as the most predominant components, said body also comprising a cured synthetic resin in substantially intimate and continuous and void-free consolidation with all filaments of said fabric.

9. A bearing element according to claim 8, in which said TFE filaments and said high-temperature nylon filaments are in the proportion of at least no more than 50 percent TFE by volume.

10. A bearing element according to claim 9, in which the TFE filaments and high-temperature nylon filaments are in the proportion of 20 to 30 percent TFE by volume.

11. A size-free low-friction fabric for void-free impregnation with a curable synthetic resin, said fabric being the washed product of construction from a yarn comprising a compounded bundle of TFE filaments and filaments of a high-temperature nylon in the proportion of at least no more than 50 percent TFE by volume and loosely twisted to the extent that an uncured synthetic resin will be self-wicking to yarn filaments throughout the body of the yarn; whereby, when said fabric is embodied in a bearing surface potted with a synthetic resin, the resin may be induced to flow into and throughout the loose yarn bundle, for substantially intimate and continuous and void-free consolidation therewith.

12. A size-free low-friction fabric for void-free impregnation with a curable synthetic resin, said fabric being the washed product of construction from a yarn comprising a compounded bundle of sized TFE filaments and sized filaments of a bondable material in the proportion of at least no more than 50 percent TFE by volume and loosely twisted to an extent not substantially exceeding three twists per inch; whereby, when said fabric is embodied in a bearing surface potted with a synthetic resin, the resin may be induced to flow into and throughout the cleaned and loose yarn bundle, for substantially intimate and continuous and void-free consolidation therewith.

13. A bearing element comprising a body with a bearing surface, said body including a size-free fabric constructed to present at said surface a loosely twisted yarn comprising TFE filaments and bondable-material filaments as the most predominant components, said body also comprising a cured synthetic resin in substantially intimate and continuous and void-free consolidation with all filaments of said fabric.

14. A size-free low-friction fabric for void-free impregnation with a curable synthetic resin, said fabric being the washed product of construction from a yarn comprising a compounded bundle of TFE filaments and filaments of a bondable material in the proportion of at least no more than 50 percent TFE by volume and loosely twisted to the extent that an uncured synthetic resin will be self-wicking to yarn filaments throughout the body of the yarn; whereby, when said fabric is embodied in a bearing surface potted with a synthetic resin, the resin may be induced to flow into and throughout the loose yarn bundle, for substantially intimate and continuous and void-free consolidation therewith.

* * * * *